United States Patent Office 3,349,468
Patented Oct. 31, 1967

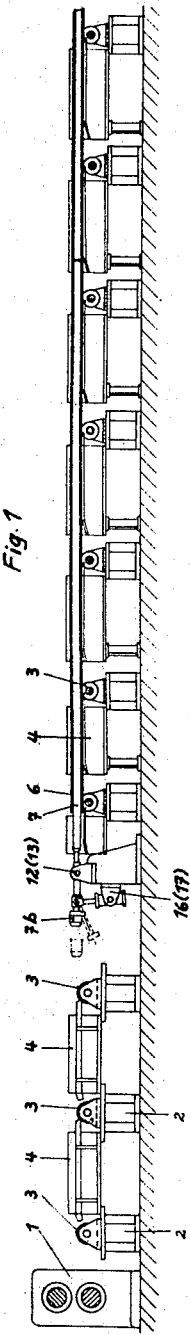

3,349,468
METHOD FOR ARRESTING A MANDREL AND TUBE DISCHARGED FROM A ROLLING MILL
Herbert Farber, Ratingen am Schuttensdick, Germany, assignor to Firma Schloemann Aktiengesellschaft, Dusseldorf, Germany
Original application May 6, 1963, Ser. No. 278,103, now Patent No. 3,237,440, dated Mar. 1, 1966. Divided and this application Sept. 8, 1965, Ser. No. 485,876.
Claims priority, application Germany, May 12, 1962, Sch 31,466
4 Claims. (Cl. 29—427)

ABSTRACT OF THE DISCLOSURE

A method of arresting a mandrel and tube discharged from a rolling mill in which the mandrel and tube are deposited onto a conveyor and the conveyor is driven to impart axial movement to the tube and mandrel. The mandrel is engaged and movement thereof arrested while the tube is allowed to continue to move axially and thereafter the tube movement is arrested.

---

This application is a division of my copending application Ser. No. 278,103 filed May 6, 1963, now Patent No. 3,237,440 granted Mar. 1, 1966, and the invention disclosed herein relates to the handling of metal products and more particularly to a method for arresting a mandrel and tube discharged from a rolling mill in such a manner as to properly position the mandrel and tube for transfer to an apparatus for withdrawing the mandrel from the tube.

In the continuous manufacture of tubes in a rolling mill, the tube and mandrel are discharged from the last roll stand of the mill at a relatively high rate of speed of the order of three to four meters per second. It is necessary to arrest the axial movement of the tube and mandrel prior to transferring the same to a mandrel withdrawing apparatus and the arresting of the movement of the tube and mandrel must be accomplished in a relatively short time and in as short a distance as possible in order to conserve space and also in order to maintain the necessary rate of production.

Heretofore the movement of the tube and mandrel has been arrested by discharging the same from the rolling mill into a discharge chute wherein the friction between the tube and surface of the chute results in slowing and stopping the axial movement of the tube and mandrel. In many cases, however, the velocity of the tube is such that the same travels to the end of the chute and strikes a stop, with the result that the mandrel moves axially within the tube due to the inertia thereof and in some cases, this results in the entire mandrel, including the reduced tongue and enlarged head on the end of the mandrel moving with the tube, thereby preventing engagement with the head by the mandrel withdrawing means and, therefore, increasing the time required to remove the mandrel from the tube. Furthermore, with this prior art arrangement the tube and mandrel frequently stops at different locations in the chute, thereby complicating the problem of removing the tube and mandrel laterally from the chute and also in properly positioning the head on the mandrel to be engaged by the mandrel withdrawing apparatus. In other words, the point at which the mandrel and tube will come to rest in the chute cannot be predicted in advance, with the result that successive mandrels and tubes deposited in the chute will stop at varying locations at random which materially complicates further necessary operations.

It is accordingly an object of the invention to provide a method for arresting a mandrel and tube discharged from a rolling mill.

A further object of the invention is the provision of a method for arresting a mandrel and tube discharged from a rolling mill in a manner to stop the mandrel and tube at a predetermined location and with the head of the mandrel disposed exteriorly of the tube to facilitate subsequent withdrawal of the mandrel from the tube.

A still further object of the invention is the provision of a method for arresting a mandrel and tube discharged from a rolling mill and which includes arresting the movement of the mandrel in such a manner as to reduce shock impact thereto.

Further objects and advantages of the invention will be apparent from the following description taken in conjunction with the accompanying drawing wherein:

FIG. 1 is a side elevational view showing an apparatus for arresting a mandrel and tube discharged from a rolling mill and constructed in accordance with this invention;

FIG. 2 a top plan view of the apparatus shown in FIG. 1;

FIG. 3 an elevational view to an enlarged scale and showing the shock absorbing means for engaging and arresting axial movement of the mandrel; and FIG. 4 a top plan view of the apparatus shown in FIG. 3.

With continued reference to the drawing, there is shown the last roll stand 1 of a rolling mill from which a tube 6 and a mandrel 7 is discharged following completion of the rolling operation and for receiving the tube and mandrel from the rolling mill there is provided a plurality of supports 2 on which are rotatably mounted double cone-shaped rollers 3. Certain of the rollers 3 are freely rotatable on the supports 2, while certain other rollers 3 are driven by variable speed motors 5 or by other suitable variable speed driving means. The tube 6 and mandrel 7 is guided along the rolls 3 in an axial path by guideways 4 positioned between adjacent rolls 3 and disposed adjacent the roller conveyor is a more or less conventional lateral transfer means 8 which serves to transfer the tube 6 and mandrel 7 laterally from the roller conveyor to lateral conveying means 9 which serves to convey the tube 6 and mandrel 7 to an apparatus for withdrawing the mandrel 7 from the tube 6.

It is to be noted that as clearly shown in FIGS. 3 and 4, the mandrel 7 is provided at the trailing end thereof with a reduced elongated tongue 7a which terminates in an enlarged head 7b. In order to arrest axial movement of the mandrel 7, there is provided an arresting apparatus in the form of a base 11 disposed between two of the rolls 3 of the roller conveyor and in alignment with the path of movement of the tube 6 and mandrel 7 along the roller conveyor and pivotally mounted on brackets 12 and 13 on the base 11 are a pair of hydraulic shock absorbers 14 and 15 disposed on opposite sides of the tube 6 and mandrel 7 moving along the roller conveyor. A cross bar 20 is provided with an upwardly opening recess 20a which is of a size to receive the reduced tongue 7a on the mandrel 7, but which is smaller than the enlarged head 7b.

A pair of hydraulic cylinders 18 and 19 are pivotally mounted on brackets 16 and 17 secured to the base 11 and the piston rods 18a and 19a are pivotally connected to the shock absorbers 14 and 15 respectively. As clearly shown in FIG. 3, operation of the hydraulic cylinders 18 and 19 will serve to move the shock absorbers 14 and 15 and cross bar 20 carried thereby from the dotted line position through an angle a, as indicated by the arrow, to the full line position, at which time the tongue 7a of the mandrel 7 is received in the recess 20a of the cross bar 20 and upon continued forward movement of the tube 6 and mandrel 7, the head 7b on the mandrel 7 will engage the cross bar 20 and forward axial movement of the mandrel 7 will be arrested without undue shock due to the action of the shock absorbers 14 and 15. Fluid pressure for operating the hydraulic cylinders 18 and 19 may be provided from any suitable source and also the operation of the hydraulic cylinders 18 and 19 may be controlled in any suitable manner.

Upon engagement of the head 7b of the mandrel 7 with the cross bar 20, the variable speed motors 5 may be operated to drive certain of the rolls 3 of the roller conveyor in a manner to move the tube 6 axially with respect to the mandrel 7, movement of which has been arrested by the cross bar 20 and in this manner the tube 6 may be moved to a predetermined position with respect to the mandrel 7, at which time the motors 5 may be stopped thereby stopping or arresting further axial movement of the tube 6. At this time the tube 6, as well as the mandrel 7 will occupy a predetermined position which will coincide with the positions occupied by succeeding tubes and mandrels and the tube 6 and mandrel 7 may at this time be removed laterally by the transferring means 8 to the lateral conveying means 9 to be conveyed to an apparatus for withdrawing the mandrel 7 from the tube 6.

The operation of the motors 5, as well as the operation of the lateral transfer means 8 and lateral conveyors 9 may be controlled by movement of the tube 7 or in any other desired manner and the specific control mechanism forms no part of this invention and any further description thereof is considered unnecessary.

It will be seen that by the above described invention there has been provided a method for arresting a mandrel and tube discharged from a rolling mill, the method involving the use of the inertia of the tube and mandrel and also of arresting movement of the mandrel in a manner to reduce shock impact thereto, while providing for accurate positioning of the tube and mandrel to facilitate further operations, such as withdrawing the mandrel from the tube.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A method of arresting a mandrel and tube discharged from a rolling mill, said method comprising the steps of depositing said mandrel and tube on a conveyor, driving said conveyor to impart movement to said tube and mandrel, engaging and arresting movement of said mandrel in a manner to reduce shock impact thereto while allowing said tube to continue to move axially, arresting movement of said tube at a predetermined location and removing said mandrel and tube from said conveyor in a direction transverse to the path of axial movement.

2. A method of arresting a mandrel and tube discharged from a rolling mill, said method comprising the steps of depositing said mandrel and tube on a conveyor, driving said conveyor to impart axial movement to said tube and mandrel, engaging and arresting movement of said mandrel in a manner to reduce shock impact thereto while allowing said tube to continue to move axially, arresting movement of said tube and removing said mandrel and tube from said conveyor in a direction transverse to the path of axial movement.

3. A method of arresting a mandrel and tube discharged from a rolling mill, said method comprising steps of depositing said mandrel and tube on a conveyor, driving said conveyor to impart axial movement to said tube and mandrel, engaging and arresting movement of said mandrel while allowing said tube to continue to move axially, arresting movement of said tube and removing said mandrel and tube from said conveyor in a direction transverse to the path of axial movement.

4. A method of arresting a mandrel and tube discharged from a rolling mill, said method comprising the steps of depositing said mandrel and tube on a conveyor, driving said conveyor to impart axial movement to said tube and mandrel, engaging and arresting movement of said mandrel while allowing said tube to continue to move axially and arresting movement of said tube.

References Cited

UNITED STATES PATENTS

| | | | |
|---|---|---|---|
| 1,709,942 | 4/1929 | Leguillon | 29—427 |
| 1,837,161 | 12/1931 | Herz | 72—209 |
| 2,011,907 | 8/1935 | Peters | 72—68 |
| 2,300,353 | 10/1942 | Eberhardt | 29—423 |

THOMAS H. EAGER, *Primary Examiner.*